July 5, 1938.  C. W. SADENWATER  2,123,081
FASTENING FOR TENON-JOINTS
Filed Feb. 8, 1937
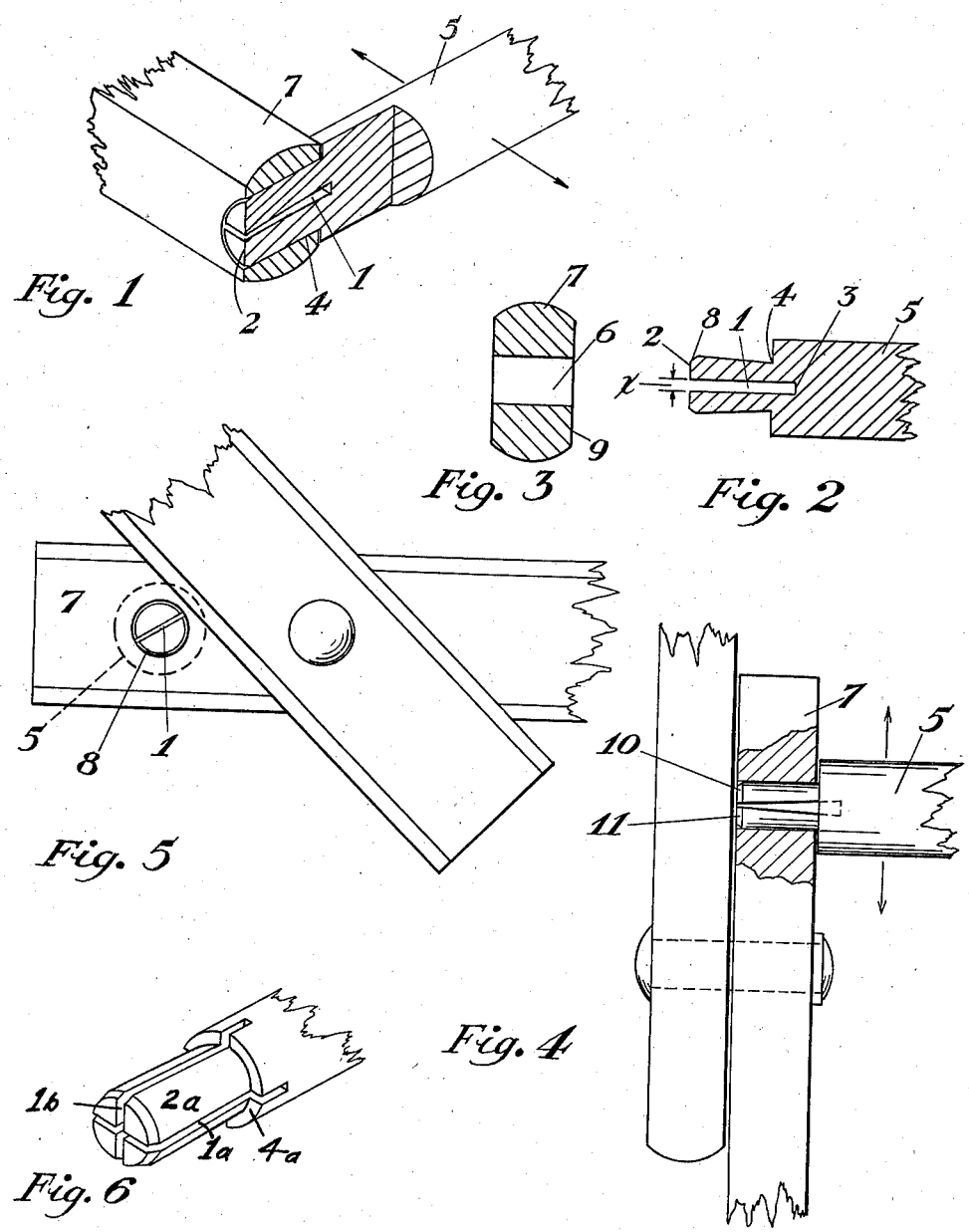
CHARLES W. SADENWATER, Inventor
By George B. Willcox
Attorney

UNITED STATES PATENT OFFICE 2,123,081

FASTENING FOR TENON-JOINTS

Charles W. Sadenwater, Saginaw, Mich., assignor to Saginaw Manufacturing Co., Saginaw, Mich., a corporation of Michigan Application February 8, 1937, Serial No. 124,678

1 Claim. (Cl. 20—92)

My invention relates to fastenings for tenon joints such as furniture joints and the like, and it consists in the combination with a member having a straight bored hole, of an automatically expansible tenon member mounted in the mortise and frictionally bound therein.

A feature of my improved joint structure is a simple arrangement and conformation of the parts of the tenon whereby the joint can be assembled by pushing the tenon into the said hole, and can be readily disassembled by simply pulling it out, yet, when in place the joint will be tight and sufficiently rigid to prevent racking of the joined members, thus contributing materially to the rigidity and stability of the completed structure in which such joints are employed.

With the foregoing and certain other objects in view which will appear later in the specification, my invention comprises the devices described and claimed and the equivalents thereof.

In the drawing, Fig. 1 is a part sectional view, in perspective, of a joint embodying my improvement.

Fig. 2 is a longitudinal section of the tenon.

Fig. 3 is a cross sectional view of a member bored to receive the tenon of Fig. 2.

Fig. 4 is a fragmentary view, partly in section, showing the tenon in use.

Fig. 5 is a side view of the parts shown in Fig. 4.

Fig. 6 is a view in perspective of a modification of the tenon.

Referring to Fig. 2, showing the tenon in longitudinal section, a longitudinal slit 1 extends from the free end 2 of the tenon to a point 3 just beyond the shoulder 4 formed on a rung or like member 5. The tenon thus bifurcated is tapered outwardly from the shoulder 4 to the free end 2. The diameter of the tenon at 4 is such as to provide a tight fit in a parallel sided hole 6 bored in the companion member 7 which is to be joined to the rung 5.

The diameter of the tenon at its free end 2 is greater than the diameter at the shoulder 4 by an amount at least equal to the thickness "X" of the slit 1. Thus the free end 2 is slightly larger than the hole 6. It is rounded at 8 to facilitate entrance into the hole.

To assemble the parts 5 and 7, the bifurcated free end 2 of the tenon is squeezed together counter to the spring action of the wood. The slit 1 is thereby closed or nearly so at its outer end, and the free end 2 of the tenon becomes small enough to be entered into the hole 6 with a tight fit, preferably equivalent to the tight fit of the part 4 in the hole. The tenon thus compressed is forced into the hole until the shoulder on the rung member stops against the face 9 of member 7. The outward spring action of the tenon at its free end, produced by the compression, frictionally binds that end of the tenon against the wall of the bore 6, and there produces a tight fit in the hole. Thus the tenon is tightly held in the hole 6 both at 2 and 4, and throughout its intermediate length.

If the parts are so proportioned that the free end of slit 1 is fully closed when inserted in the hole as above described, then the two members of the tenon will be tight together and the joint can be as rigid as may be desired, because the abutment of the two members 10, 11, Fig. 4, makes the tenon act as a practically solid piece in addition to the inherent spring action above mentioned.

If, on the other hand, a more easily detachable tenon joint is wanted, the parts may be so proportioned that the slit 1 will not quite close when the tenon is pushed into the hole. Then the tightness of the joint will depend almost entirely on the spring effect of the parts 10 and 11 and the tenon can be readily pulled out of the hole by hand.

In either case, the tenon joint can be easily separated or put together as many times as desired without damage to it.

When the parts are in place there will be no appreciable looseness or wabble between the parts 5 and 7, either vertically as indicated by the arrows in Fig. 4, or horizontally as indicated in Fig. 1, because there is always a satisfactorily close fit between the members at both ends, 2 and 4, of the tenon.

Where large diameter tenon-joints are required, it may be desirable to make the tenon as shown in Fig. 6, forming in its free end 2a two slits or saw kerfs 1a and 1b, at right angles to each other. The enlarged end of the tenon will when compressed, present a more nearly cylindrical surface than is the case with the tenon described above, insuring snug engagement with the walls of the hole into which it is inserted. The use of a single slot is sufficient, however, in joints of the size and strength ordinarily required, the slight eccentricity of the compressed tenon end not being objectionable.

In many kinds of work this feature of tightness of the joint, together with the feature of easy separation of the joint is of considerable value and convenience. For example, in the making of knock-down toggle frames of various kinds, such as those used in foldable laundry racks. The joint structure is simple, inexpensive to manufacture in quantities, durable, and rigid and anti-rattling.

Having thus described my invention, what I claim and desire to secure by Letters Patent is:

A fastening for tenon joints comprising in combination a member having a hole of uniform bore, a member formed to present a tenon having a longitudinal slit and presenting resilient fingers having outward uniform taper toward their free ends, said tenon being shaped at its smaller diameter to fit the bore when completely inserted therein so that the outward spring action of the resilient fingers provides frictional engagement of the tapered portions of the tenon throughout its length with the walls of the uniform bore, said frictional engagement constituting the sole means for releasably fastening the tenon in said bore and for maintaining the aforesaid member in alinement while in the bore.

CHARLES W. SADENWATER.